(12) United States Patent
Reeve et al.

(10) Patent No.: US 10,935,271 B2
(45) Date of Patent: Mar. 2, 2021

(54) SYSTEM AND METHOD OF HVAC HEALTH MONITORING FOR CONNECTED HOMES

(71) Applicant: Carrier Corporation, Palm Beach Gardens, FL (US)

(72) Inventors: Hayden M. Reeve, West Hartford, CT (US); Daniel J. Dempsey, Carmel, IN (US); Xinyu Wu, Shanghai (CN); Sheng Li, Shanghai (CN); Xing Cai, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/357,460

(22) Filed: Mar. 19, 2019

(65) Prior Publication Data

US 2019/0293316 A1 Sep. 26, 2019

(30) Foreign Application Priority Data

Mar. 21, 2018 (CN) .......................... 201810237893.X

(51) Int. Cl.
*F24F 11/46* (2018.01)
*F24F 11/52* (2018.01)
(Continued)

(52) U.S. Cl.
CPC .............. *F24F 11/46* (2018.01); *F24F 11/52* (2018.01); *G05B 19/048* (2013.01);
(Continued)

(58) Field of Classification Search
None
See application file for complete search history.

(56) References Cited

U.S. PATENT DOCUMENTS 6,772,096 B2 8/2004 Murakami et al.
7,072,727 B1 * 7/2006 Davis .................. F24F 11/30
700/97

(Continued)

FOREIGN PATENT DOCUMENTS

CN 202141153 U 2/2012
CN 206522846 U 9/2017
(Continued)

OTHER PUBLICATIONS

Building Remote Monitoring Management, Johnson Controls. Accessed on Feb. 21, 2018 at http://www.johnsoncontrols.com/buildings/services-and-support/operations-maintenance-and-repair-services/remote-monitoring-and-operations; 1-5 pages.
(Continued)

*Primary Examiner* — Santosh R Poudel
(74) *Attorney, Agent, or Firm* — Cantor Colburn LLP

(57) ABSTRACT

According to one embodiment, a method of operating a heating, ventilation, and air conditioning (HVAC) analytics system is provided. The method comprising: obtaining HVAC data for an HVAC unit in electronic communication with the HVAC analytics system; obtaining an HVAC unit characteristic of the HVAC unit; obtaining weather data for a geographical area where the HVAC unit is located; and determining an HVAC capacity available ratio (CAR) in response to the weather data, the HVAC unit characteristics, and the HVAC data.

13 Claims, 3 Drawing Sheets

(51) Int. Cl.
*G05B 19/048* (2006.01)
*G05B 23/02* (2006.01)
*G06Q 10/00* (2012.01)

(52) U.S. Cl.
CPC ...... *G05B 23/0232* (2013.01); *G05B 23/0283* (2013.01); *G05B 2219/2614* (2013.01); *G06Q 10/20* (2013.01)

(56) References Cited

U.S. PATENT DOCUMENTS

| | | | |
|---|---|---|---|
| 7,308,384 B2 | 12/2007 | Shah et al. | |
| 7,383,158 B2 | 6/2008 | Krocker et al. | |
| 7,963,454 B2 | 6/2011 | Sullivan et al. | |
| 8,248,252 B2 | 8/2012 | Schechter et al. | |
| 8,738,327 B2 | 5/2014 | Steinberg et al. | |
| 9,081,405 B2 | 7/2015 | Weaver et al. | |
| 9,244,471 B2 | 1/2016 | Watts et al. | |
| 9,285,802 B2 | 3/2016 | Arensmeier | |
| 9,551,504 B2 | 1/2017 | Arensmeier et al. | |
| 9,600,645 B2 | 3/2017 | Fadell et al. | |
| 9,638,436 B2 | 5/2017 | Arensmeier et al. | |
| 9,696,056 B1 | 7/2017 | Rosenberg | |
| 9,741,023 B2 | 8/2017 | Arensmeier et al. | |
| 2003/0101739 A1* | 6/2003 | Moon | F24F 11/83 62/228.1 |
| 2013/0261809 A1* | 10/2013 | Morrow | F24F 11/83 700/278 |
| 2015/0127170 A1 | 5/2015 | Quam et al. | |
| 2015/0330650 A1 | 11/2015 | Abiprojo et al. | |
| 2015/0330861 A1 | 11/2015 | Alsalem | |
| 2015/0338314 A1* | 11/2015 | Meyer | G01M 3/2815 73/40 |
| 2015/0345821 A1 | 12/2015 | Alsaleem | |
| 2016/0217674 A1 | 7/2016 | Stewart et al. | |
| 2016/0334127 A1 | 11/2016 | Rupp et al. | |
| 2016/0377309 A1 | 12/2016 | Abiprojo et al. | |
| 2017/0146964 A1 | 5/2017 | Beals | |
| 2017/0206752 A1* | 7/2017 | Wacker | F24F 11/30 |
| 2017/0278170 A1* | 9/2017 | Davis | F24F 11/64 |
| 2017/0314797 A1 | 11/2017 | Blair et al. | |
| 2017/0329357 A1* | 11/2017 | Torres | G05B 15/02 |
| 2019/0195525 A1* | 6/2019 | Varghese | F24F 11/63 |

FOREIGN PATENT DOCUMENTS

| | | |
|---|---|---|
| EP | 1851959 B1 | 2/2006 |
| WO | 2006091521 A2 | 8/2006 |

OTHER PUBLICATIONS

Diagnostics, Nexia Home. Accessed on Feb. 21, 2018 at http://www.nexiahome.com/diagnostics; 1-5 pages.

* cited by examiner

SYSTEM AND METHOD OF HVAC HEALTH MONITORING FOR CONNECTED HOMES

CROSS-REFERENCE TO RELATED APPLICATIONS

This application claims the benefit of Non-Provisional Chinese Application No. 201810237893.X filed Mar. 21, 2018, which is incorporated herein by reference in its entirety.

BACKGROUND

The subject matter disclosed herein generally relates to heating, ventilation, and air conditioning (HVAC) systems, and more specifically to an apparatus and a method for monitoring a control system of an HVAC system.

Conventional HVAC systems are often designed with enough capacity allowance to maintain comfort in an enclosed area when operating at peak heating or cooling load conditions. However current systems are unable to predict when capacity may decrease to a point where the HVAC system is unable to maintain comfort in the enclosed areas.

BRIEF SUMMARY

According to one embodiment, a method of operating a heating, ventilation, and air conditioning (HVAC) analytics system is provided. The method including: obtaining HVAC data for an HVAC unit in electronic communication with the HVAC analytics system; obtaining an HVAC unit characteristic of the HVAC unit; obtaining weather data for a geographical area where the HVAC unit is located; and determining an HVAC capacity available ratio (CAR) in response to the weather data, the HVAC unit characteristics, and the HVAC data.

In addition to one or more of the features described above, or as an alternative, further embodiments may include that determining an HVAC CAR further including: determining a trend line for HVAC available capacity as a function of a difference between an indoor air temperature (IAT) and an outside air temperature (OAT) in response to the HVAC data, HVAC unit characteristics, and the weather data; determining a trend line for HVAC required capacity as a function of a difference between the IAT and the OAT in response to the HVAC data, HVAC unit characteristics, and the weather data; determining a design load condition for the HVAC unit in response to the HVAC unit characteristic and the weather data; determining a first HVAC capacity when the trend line for HVAC available capacity is equivalent to the design load condition for the HVAC unit; determining a second HVAC capacity when the trend line for HVAC required capacity is equivalent to the design load condition for the HVAC unit, wherein the HVAC CAR is a ratio of the first HVAC capacity to the second HVAC capacity.

In addition to one or more of the features described above, or as an alternative, further embodiments may include: generating an HVAC performance report in response to the HVAC CAR; and transmitting the HVAC performance report to a user device.

In addition to one or more of the features described above, or as an alternative, further embodiments may include: activating an alarm at a selected time period when the HVAC CAR is outside of a selected range.

In addition to one or more of the features described above, or as an alternative, further embodiments may include that the HVAC data includes at least one of an IAT, an indoor air temperature rate (IATR), an OAT of a geographical area where the HVAC unit is located, and a runtime of the HVAC unit.

According to an embodiment, a heating, ventilation, and air conditioning (HVAC) analytics system is provided. The HVAC analytics system includes: an HVAC unit configured to deliver conditioned air to a targeted area; an HVAC analytics engine in electronic communication with the HVAC unit. The HVAC analytics engine is configured to: obtain HVAC data for the HVAC unit; obtain an HVAC unit characteristic of the HVAC unit; obtain weather data for a geographical area where the HVAC unit is located; and determine an HVAC capacity available ratio (CAR) of the HVAC unit in response to the weather data, the HVAC unit characteristics, and the HVAC data.

In addition to one or more of the features described above, or as an alternative, further embodiments may include that the HVAC analytics engine is further configured to: determine a trend line for HVAC available capacity as a function of a difference between an indoor air temperature (IAT) and an outside air temperature (OAT) in response to the HVAC data, HVAC unit characteristics, and the weather data; determine a trend line for HVAC required capacity as a function of a difference between the IAT and the OAT in response to the HVAC data, HVAC unit characteristics, and the weather data; determine a design load condition for the HVAC system in response to the HVAC unit characteristic and the weather data; determine a first HVAC capacity when the trend line for HVAC available capacity is equivalent to the design load condition for the HVAC system; determine a second HVAC capacity when the trend line for HVAC required capacity is equivalent to the design load condition for the HVAC system, wherein the HVAC CAR is a ratio of the first HVAC capacity to the second HVAC capacity.

In addition to one or more of the features described above, or as an alternative, further embodiments may include that the HVAC analytics engine is further configured to: generate an HVAC performance report in response to the HVAC CAR; and transmit the HVAC performance report to a user device.

In addition to one or more of the features described above, or as an alternative, further embodiments may include that the HVAC analytics engine is further configured to: activate an alarm at a selected time period when the HVAC CAR is outside of a selected range.

In addition to one or more of the features described above, or as an alternative, further embodiments may include that the HVAC data includes at least one of an IAT, an indoor air temperature rate (IATR), an OAT of a geographical area where the HVAC unit is located, and a runtime of the HVAC unit.

In addition to one or more of the features described above, or as an alternative, further embodiments may include that the HVAC analytics engine is separate and apart from the HVAC unit, and the HVAC analytics engine is in electronic communication through a wireless communication network.

In addition to one or more of the features described above, or as an alternative, further embodiments may include that the HVAC analytics engine is embedded within the HVAC unit.

In addition to one or more of the features described above, or as an alternative, further embodiments may include that the HVAC analytics engine is embedded within at least one of a mobile device, a desktop computer, and thermostat.

Technical effects of embodiments of the present disclosure include predicting potential failure of an HVAC unit by monitoring relative capacity.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Conventional HVAC control systems typically monitor only the temperature of one or more rooms in a building or house to operate an HVAC unit according to a target temperature set point value set by the user. However, various unknown system faults can cause degradation of the actual HVAC performance.

Early fault detection of an HVAC system in advance of when homeowners begin to notice a comfort issue can provide value to homeowners and dealer service persons. Generally, homeowners may not be aware of performance issues with their HVAC system during mild weather seasons. HVAC systems may already be performing poorly without the homeowner's knowledge due to a variety of HVAC issues including but not limited to a refrigerant leak, improperly-sized equipment, house envelope leakage, etc. The comfort issues may arise once the HVAC issues get worse and/or peak load conditions exist (hot summer and/or cold winter). Once peak load conditions exist, homeowners may have difficulty having their HVAC unit serviced due to an increased number of HVAC dealer/contractor service calls.

Various non-limiting embodiments of the disclosure provide an HVAC analytics engine configured to automatically analyze historical HVAC operational data and detect HVAC faults in advance of any comfort issue and then report the HVAC faults to a servicing dealer. The HVAC analytics engine analyzes historical HVAC operational data and interacts with a dealer (and/or homeowner), to support the dealer's recommendation for service and provide more effective and productive servicing of the equipment. The fault detection system can provide real time information of HVAC system performance and generate alerts when the performance degradation occurs. All of the above could help dealers provide quick response to the homeowner, even before the homeowner makes a service call.

Figure 1:
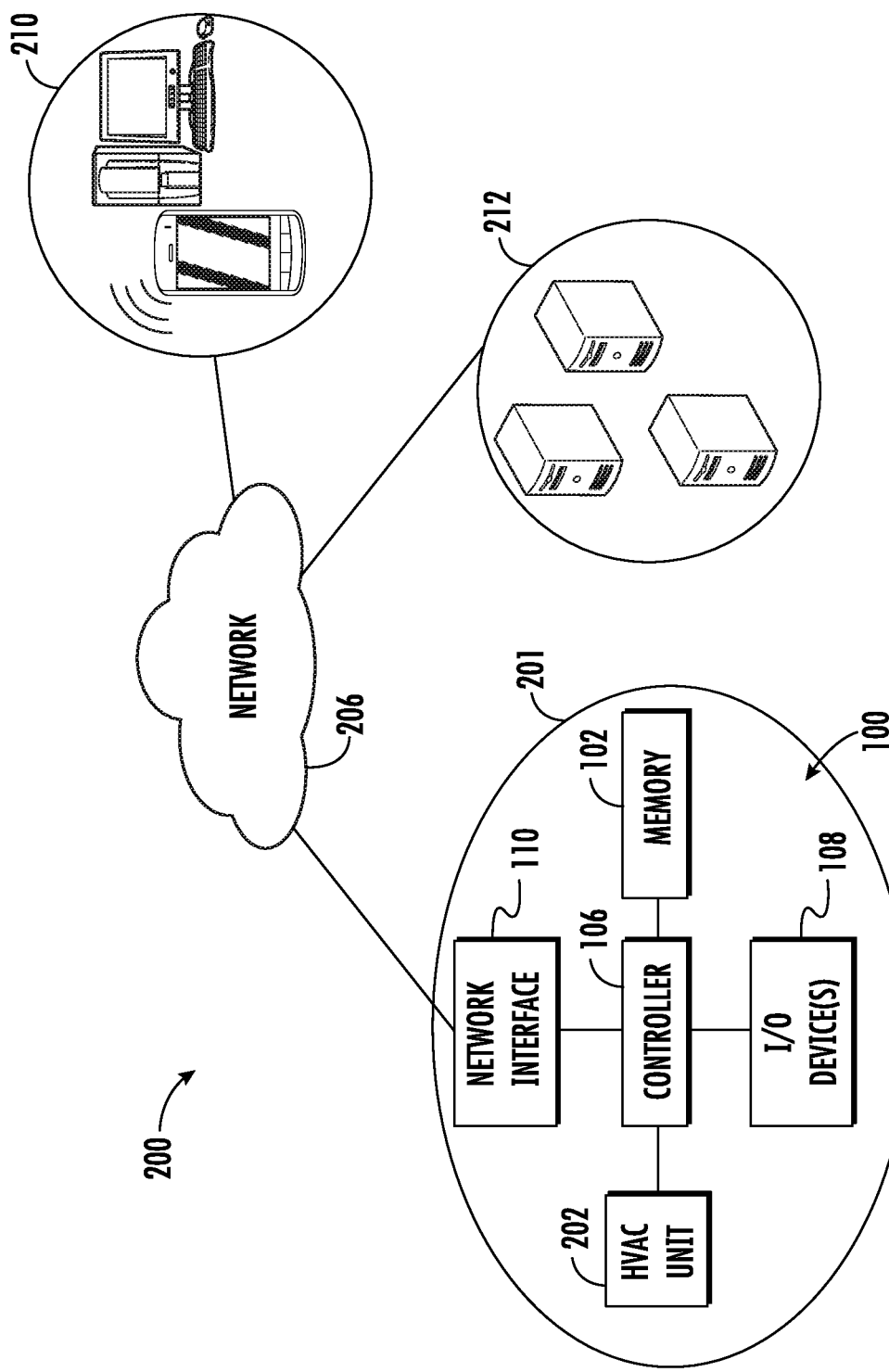
FIG. 1 illustrates a network-based HVAC system, according to an embodiment of the present disclosure.

With reference now to FIG. 1, a block diagram illustrates an HVAC network 200 in accordance with one or more non-limiting embodiments. The HVAC network 200 includes an HVAC system 201 that includes one or more HVAC units 202. Although a single HVAC unit 202 is illustrated, it should be appreciated that the HVAC system 201 can include additional HVAC units. For example, the HVAC unit 202 may be included in a group of HVAC units. An HVAC group may include additional HVAC units (not shown) located at different areas of a building or house, or even in a different home.

The HVAC unit 202 is in electronic communication with a computing system 100. The computing system 100 can be installed in the HVAC system 201 or wirelessly connected to the HVAC system through a computing network 206 while being installed on a separate server 212 or a user device 210. The computing system 100 includes a memory 102 and an electronic hardware processor or controller 106. The memory 102 stores various instructions algorithms which are executable by the controller 106. The memory 102 can also store set operating schedules, HVAC unit characteristics 354, and historical HVAC data 352 obtained from HVAC unit 202 (see FIG. 2).

The HVAC unit 202 is in electronic communication with the controller 106 such as, for example, a digital thermostat. Although one controller 106 is illustrated, it should be appreciated that multiple controllers can be located remotely from one another. Each controller 106 can control the HVAC unit 202. The controller 106 can perform various functions including, but not limited to, switching on and off the HVAC unit 202, selecting a mode (e.g., heating mode, cooling mode, etc.) of the HVAC unit 202, setting a desired room temperature at which to operate the HVAC unit 202, and setting operating schedules at which to operate the HVAC unit 202. The controller 106 is also in electronic communication with one or more sensors (not shown) configured to detect and monitor various environmental conditions such as, for example, room temperatures and humidity. In this manner, the controller 106 can actively control the HVAC unit 202 to achieve and/or maintain a room temperature set point value and/or set according to an operating schedule. The controller 106 is also configured to monitor operation of the HVAC unit 202. In this manner, the controller 106 can generate operation HVAC data 352 (see FIG. 2) based on the conditioned air produced to achieve and maintain the target temperature setpoint. The operation data includes, but is not limited to HVAC unit start times, stop times, run time duration, and temperature settings with respect to a time of day.

The controller 106 may electrically communicate with the memory 102 via one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), sensors such as temperature, pressure and occupancy, etc. The I/O device(s) 108 may be configured to provide an interface such as a thermostat interface, for example, to allow a user to interact with the computing system 100.

The computing system 100 further includes a network interface 110 capable of communication with the network 206. The network 206 can be implemented as a local on-site data network, a computer network, a telephone network, a cloud computing network, etc. The network interface 110 includes any communication device (e.g., a modem, wireless network adapter, etc.) that operates according to a network protocol (e.g., Wi-Fi, Ethernet, satellite, cable communications, etc.) which establishes a wired and/or wireless communication with the network 206. The network 206 may be in electronic communication with one or more electronic user devices 210 and various servers 212 to transmit and receive data. For example, weather data 370 (see FIG. 2) may be obtained from the various servers 212 through the network 206.

The user devices 210 include, but are not limited to, a desktop computer, a laptop computer, and a mobile device (e.g., a cell phone, smartphone, smart wearable device, etc.). The user device 210 also includes a display unit, which can display HVAC performance reports 320 (see FIG. 2). In some embodiments, the controller 106 may communicate with a user device 210 via the network 206. In some embodiments, the controller 106 may communicate directly with the user device 210. The controller 106 may include a transceiver through which the controller 106 may communicate with the user device 210. For instance, the controller 106 may be capable of communicating directly with the user device 210 via a short-range communication protocol such as, for example, Bluetooth.

Figure 2:
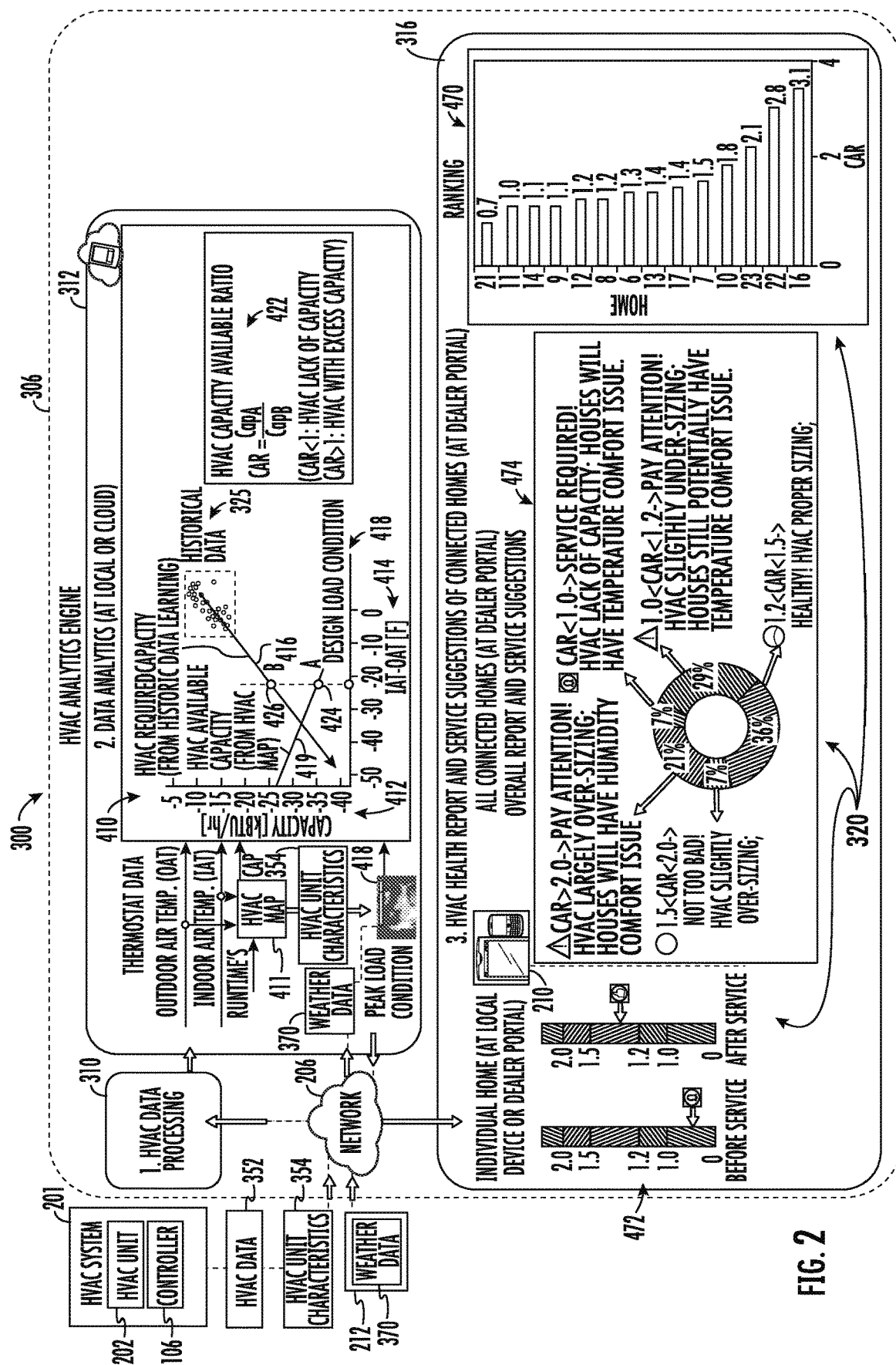
FIG. 2 illustrates an HVAC analytics engine, according to an embodiment of the present disclosure.

Turning now to FIG. 2 with continued reference to FIG. 1, an HVAC analytics system 300 is illustrated according to a non-limiting embodiment. The HVAC analytics system 300 includes the HVAC system 201 in electronic communication with the computing network 206 which employs an HVAC analytics engine 306. In one embodiment, the HVAC analytics engine 306 can be a cloud-based HVAC analytics engine. The HVAC analytics engine 306 can also be locally stored, e.g., implemented in the local controller 106. The computing network 206 and HVAC analytics engine 306 may also be in electronic communication with one or more user devices 210.

In at least one embodiment, the HVAC system 201 sends HVAC Data 352 and HVAC unit characteristics 354 to the HVAC analytics engine 306. The HVAC unit characteristics 354 include the type of HVAC unit 202, the performance rating data of the HVAC unit 202 (e.g., the performance rating maximum rated output performance per units of energy consumed), target area (i.e. room(s)) to be heated/cooled, the number of total HVAC units 202 per targeted area, an indoor air temperature rate (IATR), cooling capacity, heating capacity, and a geographical location of the HVAC system 201. The HVAC unit characteristics 354 may also include updated HVAC equipment information, which can indicate whether a new HVAC unit 202 has been installed in the HVAC system 201.

The HVAC analytics engine 306 includes an HVAC data processing module 310, an HVAC data analytics module 312, and a HVAC reporting module 316. Any one of the HVAC data processing module 310, the HVAC data analytics module 312, and the HVAC reporting module 316 can be constructed as an electronic hardware controller that includes memory and a processor configured to execute algorithms and/or computer-readable program instructions stored in the memory.

The HVAC data processing module 310 is configured to pre-process the raw HVAC data 352 from the controller 106 with the purpose to extract the essence (i.e. useful information) from data and remove the dross (i.e. data noise and useless information data). The raw HVAC data 352 may include HVAC information such as, for example, outdoor air temperature (OAT), indoor air temperature (IAT), HVAC set point, user inputs, HVAC unit running time, set temperature per hour, and actual room temperature per hour. The HVAC data processing module 310 is configured to process the HVAC data 352 in order to average out data noise to create average data such as temperature difference between IAT and OAT, average capacity, etc. The HVAC analytics engine 306 may perform a loop from the HVAC data processing module 310 to the HVAC data analytics module 312 and the HVAC reporting module 316, as seen in FIG. 2.

The HVAC data analytics module 312 is configured to determine (i.e. learn) system behavior (e.g. an HVAC Map 411) in response to the HVAC data 352 from the HVAC data processing module 310 and the HVAC unit characteristics 254. In an embodiment, the HVAC data analytics module 312 is configured to determine an HVAC map 411 in response to HVAC data 352 (e.g., at least one of the OAT, IAT, and the HVAC runtime). In the embodiment shown, the HVAC map 411 includes a trend line for HVAC available capacity 419 as a function of daily indoor outdoor temperature difference (i.e. IAT-OAT 414), as seen in FIG. 2. The HVAC data analytics module 312 determines a design load condition 418 in response to the HVAC unit characteristics 354 and weather data 370 from an external server 212. The design load condition 418 is the capacity that the HVAC system is designed to operate at based on design conditions in a given geographical location. The weather data 370 may include a past OAT and a predicted OAT for the geographical area where the HVAC system 201 is located. The predicted OAT may be based upon predicted weather forecasts and/or past OAT recorded.

The HVAC data analytics module 312 is configured to determine an HVAC capacity available ratio (CAR) 422 in response to the design load condition 418, a trend line for HVAC required capacity 416, and a trend line for HVAC available capacity 419. As shown in FIG. 2, a method 410 may be used to determine the HVAC CAR 422. In the embodiment shown, the method 410 correlates the HVAC data 352 to plot an average capacity 412 of the HVAC system 201 with IAT-OAT 414 of the HVAC system 201. The average capacity 412 may be a daily average, a bi-daily average, or any other segmented average amount. A trend line for HVAC required capacity 416 of the HVAC system 201 is determined from the capacity 412 versus IAT-OAT 414 plot. The trend line for HVAC required capacity 416 represents the average capacity 412 as a function of daily indoor outdoor temperature difference (i.e. IAT-OAT 414). The HVAC required capacity 416 may be a daily average, a bi-daily average, or any other segmented average amount.

The HVAC CAR 422 is determined from at least two HVAC capacities 424, 426 where the design load condition 418 intersects with the trend line for HVAC available capacity 419 and the trend line for HVAC required capacity 416. The trend line for HVAC available capacity 419 is about equivalent to the design load condition 418 at a first HVAC capacity 424 (i.e. CapA in FIG. 2) and the trend line for HVAC required capacity 416 is about equivalent to the design load condition 418 at a second HVAC capacity 426 (i.e. CapB in FIG. 2). The HVAC CAR 422 may be determined by the ratio of first HVAC capacity 424 (i.e. CapA in FIG. 2) to second HVAC capacity 426 (i.e. CapB in FIG. 2), as seen by Eq. 1 below.

$$HVAC\ CAR = \frac{Cap_A}{Cap_B} \quad \text{[Eq. 1]}$$

An HVAC CAR 422 that is less than (1) means that the HVAC system 201 lacks capacity whereas and HVAC CAR 422 that is greater than (1) means that the HVAC system 201 has excess capacity relative to the design load condition 418. Further an HVAC CAR 422 that is less than (1) means that the HVAC system 201 lacks capacity and the HVAC system 201 may no longer able to maintain comfort within the targeted area at or above the design load condition 418. The cause of the lack of capacity could be due to an undersized system or loss of performance due to refrigerant leak, expansion valve malfunction, dirty coils, etc.

The HVAC reporting module 316 is also configured to generate one or more HVAC performance reports 320 depicting the HVAC CAR 422. The HVAC reporting module 316 also generates and transmits a HVAC performance reports 320 to the user device 210. A display unit of the user device 210 may display HVAC performance reports 320. Advantageously, the HVAC performance reports 320 may help an HVAC repairman catch and fix issues causing reduced capacity in the HVAC system 201 prior to the owner of the HVAC system 201 feeling any discomfort associated with an issue. An alert may be generated to draw attention to the HVAC CAR 422 of the HVAC system 201. The alert may be activated during a selected time period when the HVAC CAR 422 is outside of a selected range.

In one example, the HVAC performance report 320 may show the HVAC CAR 422 of a selected number of HVAC systems 201 for comparison and ranking in graph 470. In another example, the HVAC performance report 320 may show the HVAC CAR 422 of an HVAC system 201 before and after a repair to illustrate an improvement in the HVAC CAR 422 of the HVAC system 201 due to the repair, as shown by graph 472. In yet another example, the HVAC performance report 320 may show an overall graph 474 for multiple HVAC systems 201, sectioned out into different ranges of the HVAC CAR 422, based on the health of the HVAC system 201. Advantageously, the graph 474 allows an HVAC repairman to keep track of the HVAC CAR 422 value of a portfolio of HVAC systems 201 and know at a glance the health of the overall portfolio. The graph may include an easy to read key explaining different ranges of HVAC CAR 422 values. For instance: an HVAC CAR 422<(1) requires service because the HVAC system 201 lacks capacity and will have temperature and comfort issues; if (1)<HVAC CAR 422<(1.2) then attention is warranted because the HVAC system 201 is slightly undersized and may have temperature and comfort issues; if (1.2)<HVAC CAR 422<(1.5) then the HVAC system 201 is healthy and the HVAC system 201 is properly sized; if (1.5)<HVAC CAR 422<(2.0) then the HVAC system 201 is slightly over-sized; and if HVAC CAR 422>(2.0) then pay attention because the HVAC system 201 is largely over-sized and may have humidity and comfort issues.

Figure 3:
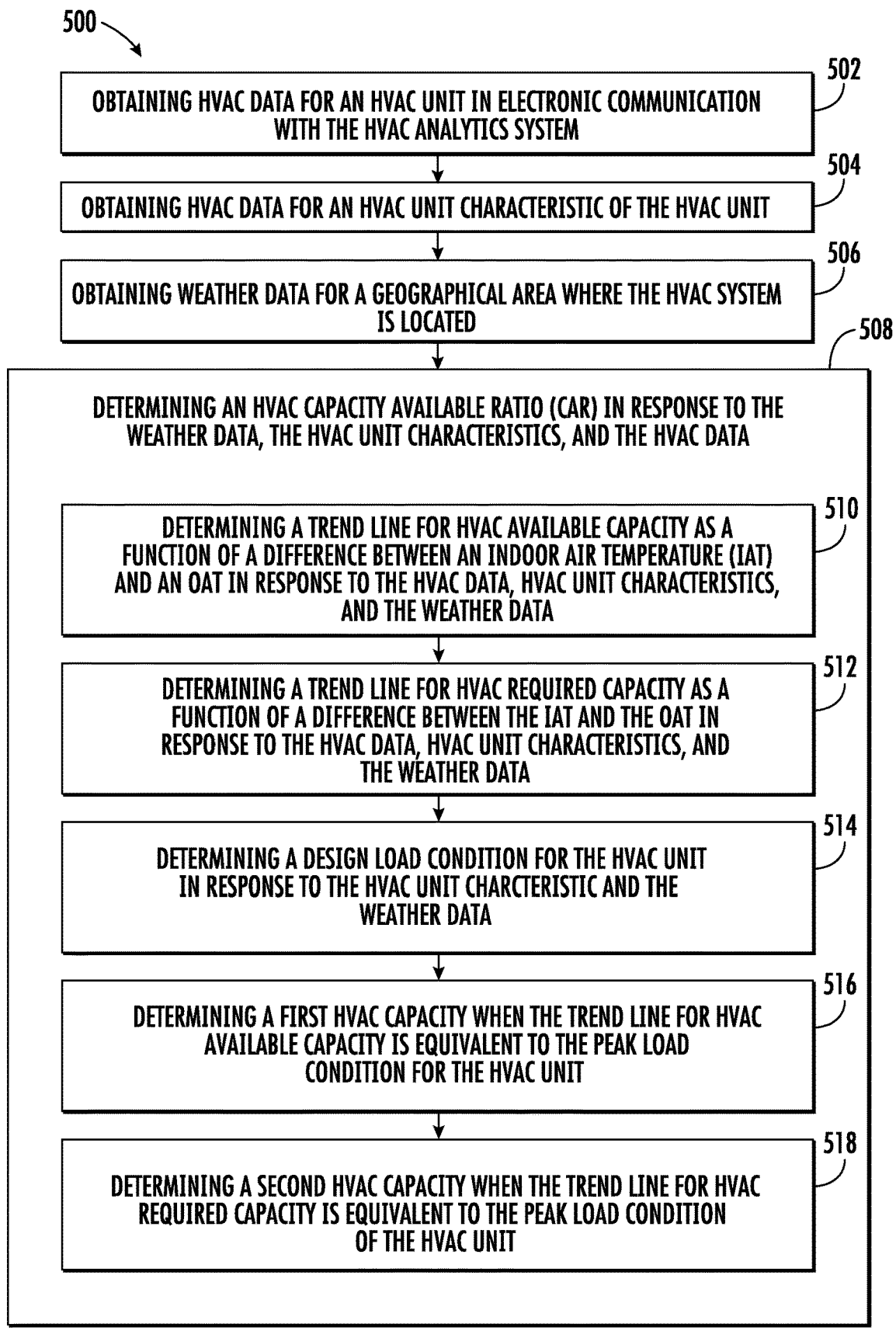
FIG. 3 is a flow diagram illustrating a method of operating an HVAC analytics engine, according to an embodiment of the present disclosure.

Referring now also to FIG. 3 with continued reference to FIGS. 1-2. FIG. 3 shows a flow diagram illustrating a method 500 of operating an HVAC analytics system 300, according to an embodiment of the present disclosure. As described above HVAC analytics system 300 may be a cloud-based system and/or the HVAC analytics system 300 may be incorporated into the controller 106 of an HVAC system 201.

At block 502, HVAC data 352 of the HVAC system 201 is obtained. The HVAC data 352 can be obtained from the HVAC controller 106, and can be communicated to the HVAC analytics engine 306 in real-time, and/or can be delivered in response to a data request sent by the HVAC analytics engine 306. At block 504, HVAC unit characteristics 354 of the HVAC system 201 is obtained. The HVAC unit characteristics 354 can be obtained from the HVAC controller 106, and can be communicated to the HVAC analytics engine 306 in real-time, and/or can be delivered in response to a data request sent by the HVAC analytics engine 306. In another embodiment, the HVAC unit characteristics 354 can be obtained from a separate server 212 (e.g. the server 212 is configured to store the HVAC unit characteristics 354 for each HVAC system 201), and can be communicated to the HVAC analytics engine 306 in real-time, and/or can be delivered in response to a data request sent by the HVAC analytics engine 306. At block 506, the data analytics module 316 obtains weather data 370 from an external server 212 for the geographical area where the HVAC system 201 is located.

At block 508, the data analytics module 316 determines an HVAC CAR 422 in response to the weather data 370, the HVAC unit characteristics 354, and the HVAC data 352. In order to determine the HVAC CAR 422 the data analytics module 316 may perform block 510-518.

At block 510, a trend line for HVAC available capacity 419 as a function of a difference between the IAT and the OAT 414 is determined in response to the HVAC data 352, HVAC unit characteristics 354, and the weather data 370. The available capacity 419 may be a function of at least one of IAT and OAT. At block 512, a trend line for HVAC required capacity 416 as a function of a difference between the IAT and the OAT 414 is determined in response to the HVAC data 352, HVAC unit characteristics 354, and the weather data 370. The required capacity 416 may be a function of at least one of IAT and OAT.

At block 514, a design load condition 418 for the HVAC unit 202 is determined in response to the HVAC unit characteristic 354 and the weather data 370. At block 516, a first HVAC capacity 424 when the trend line for HVAC available capacity 419 is equivalent to the design load condition for the HVAC unit 202 is determined. At block 518, a second HVAC capacity 426 when the trend line for HVAC required capacity 416 is equivalent to the design load condition 418 for the HVAC unit 202 is determined. As mentioned above, the HVAC CAR 422 is a ratio of the first HVAC capacity 424 to the second HVAC capacity 426.

The method 500 may include that one or more HVAC performance reports 320 are generated in response to the HVAC CPI degradation trend line 438. The HVAC performance reports 320 include various analytical data predicting performance of the HVAC system 201 over a period of time. At block 516, the HVAC performance reports 320 are transmitted to a user device 210 in electronic communication with the computing network 206. The reports can be displayed via the user device 210 such that a user (e.g. Dealer, maintainer, or homeowner) is able to monitor the operating performance of the HVAC system 201.

While the above description has described the flow process of FIG. 3 in a particular order, it should be appreciated that unless otherwise specifically required in the attached claims that the ordering of the steps may be varied.

As used herein, the term "module" or "unit" can refer to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a heating, ventilation, and air conditioning (HVAC) analytics system, the method comprising:

obtaining HVAC data for an HVAC unit in electronic communication with the HVAC analytics system;

obtaining an HVAC unit characteristic of the HVAC unit;

obtaining weather data for a geographical area where the HVAC unit is located; and determining an HVAC capacity available ratio (CAR) in response to the weather data, the HVAC unit characteristics, and the HVAC data, wherein determining the HVAC CAR further comprises:

determining a trend line for HVAC available capacity as a function of a difference between an indoor air temperature (IAT) and an outside air temperature (OAT) in response to the HVAC data, HVAC unit characteristics, and the weather data;

determining a trend line for HVAC required capacity as a function of a difference between the IAT and the OAT in response to the HVAC data, HVAC unit characteristics, and the weather data;

determining a first HVAC capacity when the trend line for HVAC available capacity is equivalent to a design load condition for the HVAC unit;

determining a second HVAC capacity when the trend line for HVAC required capacity is equivalent to the design load condition for the HVAC unit, wherein the HVAC CAR is a ratio of the first HVAC capacity to the second HVAC capacity; and transmitting the HVAC CAR to a user device.

2. The method of claim 1, wherein determining an HVAC CAR further comprising:

determining the design load condition for the HVAC unit in response to the HVAC unit characteristic and the weather data.

3. The method of claim 1, further comprising:

generating an HVAC performance report in response to the HVAC CAR; and transmitting the HVAC performance report to the user device.

4. The method of claim 1, further comprising:

activating an alarm at a selected time period when the HVAC CAR is outside of a selected range.

5. The method of claim 1, wherein:

the HVAC data includes at least one of an IAT, an indoor air temperature rate (IATR), an OAT of a geographical area where the HVAC unit is located, and a runtime of the HVAC unit.

6. A heating, ventilation, and air conditioning (HVAC) analytics system comprising:

an HVAC unit configured to deliver conditioned air to a targeted area;

an HVAC analytics engine in electronic communication with the HVAC unit, the HVAC analytics engine configured to:

obtain HVAC data for the HVAC unit;

obtain an HVAC unit characteristic of the HVAC unit;

obtain weather data for a geographical area where the HVAC unit is located; and determine an HVAC capacity available ratio (CAR) of the HVAC unit in response to the weather data, the HVAC unit characteristics, and the HVAC data, wherein the HVAC analytics engine is further configured to:

determine a trend line for HVAC available capacity as a function of a difference between an indoor air temperature (IAT) and an outside air temperature (OAT) in response to the HVAC data, HVAC unit characteristics, and the weather data;

determine a trend line for HVAC required capacity as a function of a difference between the IAT and the OAT in response to the HVAC data, HVAC unit characteristics, and the weather data;

determine a first HVAC capacity when the trend line for HVAC available capacity is equivalent to a design load condition for the HVAC unit;

determine a second HVAC capacity when the trend line for HVAC required capacity is equivalent to the design load condition for the HVAC unit, wherein the HVAC CAR is a ratio of the first HVAC capacity to the second HVAC capacity; and transmit the HVAC CAR to a user device.

7. The HVAC analytics system of claim 6, wherein the HVAC analytics engine is further configured to:

determine the design load condition for the HVAC system in response to the HVAC unit characteristic and the weather data.

8. The HVAC analytics system of claim 6, wherein the HVAC analytics engine is further configured to:

generate an HVAC performance report in response to the HVAC CAR; and transmit the HVAC performance report to the user device.

9. The HVAC analytics system of claim 6, wherein the HVAC analytics engine is further configured to:

activate an alarm at a selected time period when the HVAC CAR is outside of a selected range.

10. The HVAC analytics system of claim 6, wherein:

the HVAC data includes at least one of an IAT, an indoor air temperature rate (IATR), an OAT of a geographical area where the HVAC unit is located, and a runtime of the HVAC unit.

11. The HVAC analytics system of claim 6, wherein:

the HVAC analytics engine is separate and apart from the HVAC unit, and wherein the HVAC analytics engine is in electronic communication through a wireless communication network.

12. The HVAC analytics system of claim 6, wherein:

the HVAC analytics engine is embedded within the HVAC unit.

13. The HVAC analytics system of claim 6, wherein:

the HVAC analytics engine is embedded within at least one of a mobile device, a desktop computer, and thermostat.

\* \* \* \* \*